US008873581B2

(12) United States Patent
Pourbigharaz et al.

(10) Patent No.: US 8,873,581 B2
(45) Date of Patent: *Oct. 28, 2014

(54) GRAPHICS MULTI-MEDIA IC AND METHOD OF ITS OPERATION

(75) Inventors: Fariborz Pourbigharaz, Markham (CA); Sergiu Goma, Stouffville (CA); Milivoje Aleksic, Richmond Hill (CA); Andrzej Mamona, Markham (CA)

(73) Assignee: ATI Technologies ULC, Markham, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/495,518

(22) Filed: Jun. 13, 2012

(65) Prior Publication Data

US 2013/0010168 A1    Jan. 10, 2013

Related U.S. Application Data

(63) Continuation of application No. 12/141,358, filed on Jun. 18, 2008, now Pat. No. 8,223,796.

(51) Int. Cl.
| | |
|---|---|
| *H04L 12/42* | (2006.01) |
| *G09G 5/00* | (2006.01) |
| *G06F 3/14* | (2006.01) |
| *G09G 5/39* | (2006.01) |
| *H04N 1/00* | (2006.01) |
| *G09G 5/36* | (2006.01) |

(52) U.S. Cl.
CPC ............ *G09G 5/363* (2013.01); *G09G 2370/10* (2013.01); *G09G 5/006* (2013.01); *G06F 3/14* (2013.01); *G09G 2370/04* (2013.01); *G09G 5/39* (2013.01); *H04N 1/00278* (2013.01); *G09G 2360/06* (2013.01); *G09G 2330/021* (2013.01)
USPC .......................................... 370/466; 370/389

(58) Field of Classification Search
USPC .......... 370/465, 466, 276, 279; 345/501, 519, 345/520
See application file for complete search history.

(56) References Cited

U.S. PATENT DOCUMENTS

| | | | |
|---|---|---|---|
| 4,947,342 A | 8/1990 | Katsura et al. | |
| 6,697,070 B1 | 2/2004 | Katsura et al. | |

(Continued)

FOREIGN PATENT DOCUMENTS

| | | |
|---|---|---|
| CN | 1574937 A | 2/2005 |
| CN | 1592388 A | 3/2005 |

(Continued)

OTHER PUBLICATIONS

International Search Report; PCT International Application No. PCT/CA2009/000791; dated Sep. 21, 2009.

(Continued)

*Primary Examiner* — Gary Mui
(74) *Attorney, Agent, or Firm* — Faegre Baker Daniels LLP

(57) ABSTRACT

A graphics multi-media integrated circuit (GMIC) is connected to a host processor over two serial links: a half duplex bi-directional serial link which accords to a display serial interface protocol, and a uni-directional serial link which accords to a camera serial interface protocol. The GMIC receives packets from the host over the half duplex bi-directional serial link and processes these packets. The GMIC sends packets over the uni-directional serial link. A packet from the host can request a processing operation by the GMIC or can initiate a memory operation at the memory of the GMIC. The GMIC can also send packets to the host to initiate a host memory operation and may be connected to a display over a bi-directional serial link and to a camera over a uni-directional serial link and a bi-directional control link allowing the host to control the display and camera.

20 Claims, 7 Drawing Sheets

(56) References Cited

U.S. PATENT DOCUMENTS

| | | |
|---|---|---|
| 2001/0011965 A1 | 8/2001 | Wilks |
| 2001/0030649 A1 | 10/2001 | Mamiya et al. |
| 2002/0052220 A1 | 5/2002 | Tsukada et al. |
| 2005/0007373 A1 | 1/2005 | Lim |
| 2005/0204057 A1 | 9/2005 | Anderson et al. |
| 2006/0082580 A1 | 4/2006 | Chow et al. |
| 2006/0083239 A1 | 4/2006 | Kobayashi |
| 2007/0071343 A1 | 3/2007 | Zipnick et al. |
| 2007/0201492 A1 | 8/2007 | Kobayashi |
| 2008/0205306 A1* | 8/2008 | Saito .............................. 370/294 |
| 2009/0315899 A1 | 12/2009 | Pourbigharaz et al. |

FOREIGN PATENT DOCUMENTS

| | | |
|---|---|---|
| JP | 2001228841 | 8/2001 |
| JP | 2005049818 | 2/2005 |
| WO | 2006058051 A2 | 6/2006 |

OTHER PUBLICATIONS

Mui, Gary, "USPTO Communication," mailed Mar. 13, 2012, in relation to U.S. Appl. No. 12/141,358, filed Jun. 18, 2008.

Mui, Gary, "USPTO Communication," mailed Oct. 4, 2011, in relation to U.S. Appl. No. 12/141,358, filed Jun. 18, 2008.

Japanese Patent Office, "Notification of Reason(s) for Refusal", mailed Mar. 21, 2013, in related Japanese Patent Application No. 2011-513829. (Partial English Translation).

Chinese Patent Office, "Office Action", mailed May 30, 2013, in related Chinese Patent Application No. 200980132169.X.

Extended European Search Report issued in corresponding EP Application No. 09 76 5290 dated Dec. 11, 2013.

Desoli et al. "An Outlook on the Evolution of Mobile Terminals: From Monolithic to Modular Multi-Radio, Multi Application Platforms", IEEE Circuits and Systems Magazine, vol. 6, No. 2, Jan. 1, 2006.

Stmicroelectronics: "STV0986", datasheet, Jan. 31, 2007, XP002717246.

Minyoung Eom et al. "Camera interface method in mobile handset and its performance comparison", Parallel Processing Workshops, 2007. ICPPW 2007. International Conference on, IEEE, Piscataway, NJ, USA, Sep. 1, 2007.

* cited by examiner

| DATA ID (Reserved by DSI) | RD/WR | RD/WR | Transaction | Addressing | Packet Type |
|---|---|---|---|---|---|
| XX10 1100 | WR | HOST→GMIC | Write packet for setting the most significant 16 bit indirect address in GMIC | Indirect | Short |
| XX11 1100 | WR | HOST→GMIC | Write packet for setting the least significant 16 bit indirect address in GMIC | Indirect | Short |
| XX11 0011 | WR | HOST→GMIC | Write to the location pointed by GMIC indirect register | Indirect | Long |
| XX11 0100 | RD | HOST→GMIC | Read request from the location pointed by GMIC indirect register | Indirect | Short |
| XX11 0110 | WR | HOST→GMIC | Write with first 4 bytes of the payload representing 32 bit address Word Count = number of data bytes to be written + 4 | Direct | Long |
| XX01 0111 | RD | HOST→GMIC | Read request with 4 bytes of address embedded in payload Word Count = 4 | Direct | Long |
| XX11 1011 | WR | HOST→GMIC | Read response to a read request previously initiated by GMIC Word Count = number of data bytes being read | Direct | Long |
| XX00 1010 | WR | HOST→GMIC | Credit packet | N/A | Short |
| XX11 1000 | WR | HOST→GMIC | Error report or Acknowledge | N/A | Short |
| XX10 1010 | WR | HOST→GMIC | Interrupt request 4 bytes of address embedded in payload as interrupt number | N/A | Long |

FIG. 5A

| DATA ID (Reserved by DSI) | RD/WR | RD/WR | Transaction | Addressing | Packet Type |
|---|---|---|---|---|---|
| XX11 1010 | WR | GMIC→HOST | Write packet for setting the most significant 16 bit indirect address in HOST | Indirect | Short |
| XX11 0111 | WR | GMIC→HOST | Write packet for setting the least significant 16 bit indirect address in HOST | Indirect | Short |
| XX11 1000 | WR | GMIC→HOST | Write to the location pointed by HOST indirect register | Indirect | Long |
| XX11 1001 | RD | GMIC→HOST | Read request from the location pointed by HOST indirect register | Indirect | Short |
| XX11 1010 | WR | GMIC→HOST | Write with first 4 bytes of the payload representing 32 bit address Word Count = number of data bytes to be written + 4 | Direct | Long |
| XX11 1011 | RD | GMIC→HOST | Read request with 4 bytes of address embedded in payload Word Count = 4 | Direct | Long |
| XX11 1100 | WR | GMIC→HOST | Read response to a read request previously initiated by HOST Word Count = number of data bytes being read | Direct | Long |
| XX11 1101 | WR | GMIC→HOST | Credit packet | N/A | Short |
| XX11 1110 | WR | GMIC→HOST | Error report or Acknowledge | N/A | Short |
| XX11 1111 | WR | GMIC→HOST | Interrupt request 4 bytes of address embedded in payload as interrupt number | N/A | Long |

FIG. 5B

GRAPHICS MULTI-MEDIA IC AND METHOD OF ITS OPERATION

RELATED CO-PENDING APPLICATION

This application is a continuation of U.S. patent application Ser. No. 12/141,358, filed Jun. 18, 2008, entitled "GRAPHICS MULTI-MEDIA IC AND METHOD OF ITS OPERATION", having inventors Fariborz Pourbigharaz et al., owned by instant assignee and is incorporated herein by reference.

BACKGROUND

This invention relates to an approach for utilising a graphics multi-media integrated circuit (GMIC).

The electronic handling of media, such as graphics, can place a heavy load on a processor. For this reason, many devices (such as personal computers and mobile devices, such as cell phones and personal digital assistants) may incorporate a special purpose integrated circuit which handles media and therefore off-loads such handling from the host processor of the device. Such an integrated circuit is sometimes referred to as a graphics multi-media integrated circuit, or GMIC. Different GMICs exist as the functions that are to be performed by the GMIC vary for different devices. In general, a GMIC may include one or more of the following modules: a 2-D graphics controller; a 3-D graphics controller; a display controller; a video and input camera controller; a memory controller (e.g., a direct memory access-DMA-controller); memory (e.g., flash memory); a general purpose input/output controller; an audio processor (e.g., an audio playback controller); and a video processor (e.g., a video coder and decoder).

In a typical device, the GMIC is connected to the parallel bus of the motherboard and protocols are developed to allow communication between the GMIC and the host processor of the device. Due to a lack of standardisation for these communication protocols, GMICs are highly specific to the device in which they are used.

This invention seeks to provide an improved approach to media handling.

SUMMARY OF INVENTION

A graphics multi-media integrated circuit (GMIC) is connected to a host processor over a half duplex bi-directional serial link which accords to a protocol defined for a display serial interface and may also be connected to the host over a uni-directional serial link which accords to a compatible protocol defined for a camera serial interface. The GMIC receives packets according to the protocol from the host over the half duplex bi-directional serial link and processes these packets. The GMIC may send packets according to the protocol to the host over the uni-directional serial link. A packet from the host can request a processing operation by the GMIC or can initiate a memory operation at the memory of the GMIC. The GMIC can also send packets to the host to initiate a memory operation at the memory of the host. The GMIC may be connected to a display over another bi-directional serial link according to the display serial interface protocol and to a camera over another uni-directional serial link and a bi-directional control link according to the camera serial interface so that the host controls the display and camera indirectly through the GMIC.

In accordance with the present invention, there is provided a method of communicating at a graphics multi-media integrated circuit comprising: receiving data packets compatible with a first packet protocol from a host over a first half duplex bi-directional serial link; processing packets from said host; sending data packets compatible with a second packet protocol toward said host over a first uni-directional serial link.

In accordance with another aspect of the invention, there is provided a graphics multi-media integrated circuit (GMIC) comprising: a first half duplex bi-directional display serial interface transceiver for connection to a host for sending packets to said host and receiving packets from said host, at least when said GMIC is in a normal mode of operation; a first uni-directional camera serial interface transmitter for connection to said host for sending packets to said host; a camera control interface slave transceiver for receiving control messages; a graphics engine; and a bus connecting said display serial interface transceiver, said camera serial interface transmitter, and said graphics engine.

In accordance with a further aspect of the invention, there is provided a system, comprising: a graphics multi-media integrated circuit (GMIC) comprising: a first GMIC display serial interface transceiver; a GMIC camera serial interface transmitter; a GMIC camera control interface slave transceiver; a graphics engine; and a bus connecting said GMIC display serial interface transceiver, said GMIC camera serial interface transmitter, and said graphics engine; a host comprising: a host display serial interface transceiver; a host camera serial interface receiver; a half duplex display serial interface pathway connecting said first GMIC display serial interface transceiver with said host display serial interface transceiver; and a uni-directional camera serial interface pathway connecting said GMIC camera serial interface transmitter with said host camera serial interface receiver.

Other features and advantages of the invention will become apparent from the following description in conjunction with the drawings.

BRIEF DESCRIPTION OF THE DRAWINGS

In the figures which illustrate example embodiments of the invention.

DETAILED DESCRIPTION

In known mobile communication devices, a parallel bus is used to connect the host processor to the display, any camera, and any GMIC. Recently, the Mobile Industry Processor Interface (MIPI™) Alliance has contemplated a camera serial interface (CSI) between the camera and host and a display serial interface (DSI) between the display and the host.

The inventor has contemplated an alternate arrangement for devices wherein the host is connected to the GMIC and the GMIC is connected to the display and to any camera. Thus, the GMIC is interposed between the host and the display and camera. The inventor has further considered that the contemplated DSI or the contemplated CSI and DSI interfaces can be used for all communications between the GMIC and the host. An advantage of this approach is that a host designed to use the CSI and DSI interfaces to communicate with a camera and display can use these same interfaces to communicate with the GMIC and, through the GMIC, interface with these peripherals. The inventor has also contemplated that the serial interfaces between the host and GMIC can be used to allow each to randomly access the memory of the other. Notably, the approach does not require any additional ports at the host.

Figure 1:
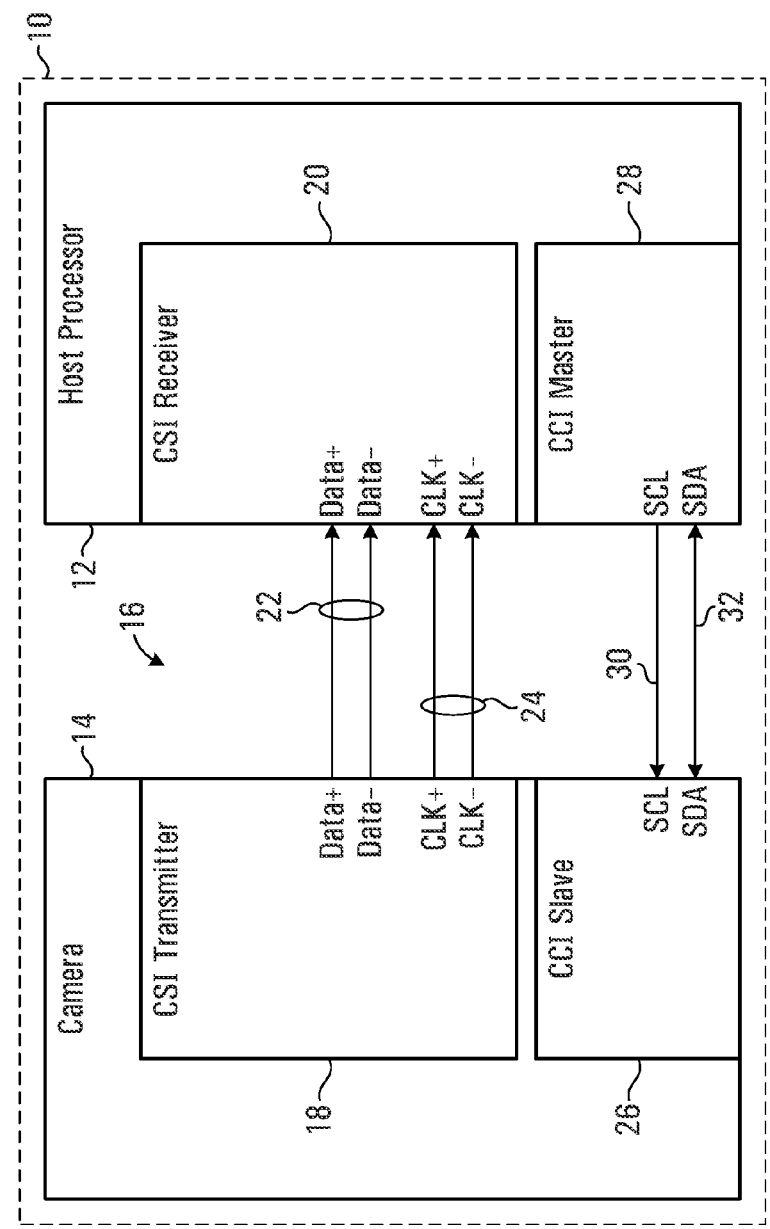
FIG. 1 is a schematic view of a portion of a known mobile electronic device.

As illustrated in FIG. 1, the contemplated CSI defines a serial interface 16 between a camera 14 and a host processor 12. The serial interface comprises a CSI transmitter 18 in the camera and a CSI receiver 20 in the host connected by a physical data path 22 and a physical clock path 24. The data and clock paths are differential pairs, each having a positive wire and a negative wire. As will be understood by those skilled in the art, the use of differential pairs allows for high speed data transfer. The serial interface also includes a camera control (CCI) interface, with a CCI slave 26 in the camera and a CCI master 28 in the host connected by two conductors: a conductor 30 for a clock signal and a conductor 32 for a data signal. The clock signal is provided by the CCI master 28 to the CCI slave on conductor 30; the CCI data conductor 32 is bi-directional.

The CCI interface may accord to the I$^2$C bus system described in the "I$^2$C Bus Specification Version 2.1" issued by Philips Semiconductors in January, 2000, the contents of which are incorporated herein by reference.

Parallel (image) data at the camera 14 may be sent to the host 12 on the serial link from the parallel bus in the camera. This data is organised as packets. Two packet formats are provided: a long packet format and a short packet format. The long packet format has a header, payload, and a footer. The header has a data identifier which is one byte in length, a word count which is two bytes in length, and an error correction code, which is one 1 byte in length.

The one byte data identifier includes a two bit virtual-channel identifier and a six bit data type which itself includes an indicator of whether the packet is a short or long packet. The two bit virtual channel identifier allows up to four peripherals to share one CSI link, with each peripheral being assigned to a particular channel. Since the length of long packets is specified by a two byte word count, a long packet may be up to 65,541 bytes long. This permits transmission of large blocks of pixels.

The short packet format contains only a header, as aforedescribed, except that, in the short packet, the two byte word count field in the header is replaced by a short packet data field of two bytes in length.

The serial interface is point-to-point. Therefore only one peripheral can connect directly to a CSI port on the host processor, any others must be connected indirectly through a hub, or through the first peripheral acting as a hub. The serial camera control interface (CCI) is for sending control messages. To allow for the handling of multiple peripherals, the CCI provides for slave addressing. Thus, an electronic device may have one CCI master in the host processor, and an addressable CCI slave in each of several peripherals.

A basic CCI message consists of a START condition, followed by the slave address and a read/write bit. Next is an acknowledgement back from the slave. The master then sends a sub-address pointing to a register inside the slave, and an acknowledgement is sent back from the slave. For a write operation, a data byte is then sent from the master and an acknowledgement or non-acknowledgement is returned from the slave. This is followed by a STOP condition. For a read operation, the data byte flows from the slave and the acknowledgement or non-acknowledgement flows back from the master. This is then followed by the STOP condition.

A high-speed uni-directional data link from the camera to the host allows for quantities of pixel data to be passed to the host. The separate slower speed control link from the host to the camera allows the host to control the camera.

The contemplated CSI has no flow control: data sinks must have a capacity at least equal that of data sources.

A similar serial interface is provided for a display in the contemplated DSI. However, data is much more bi-directional with a display than it is with a camera. For this reason, a high speed link in one direction and a slower speed link in the opposite direction is not optimal. Instead, the serial data and clock paths of the DSI terminate at a transceiver in each of the host and display to allow for (half-duplex) bi-directional data flow. With a high speed dual direction link, no CCI is required with the DSI since the host may send commands to the peripheral directly on the bi-directional data lanes.

The contemplated CSI and DSI are designed to provide a serial communication link between a peripheral and a host processor. They are not designed to provide for communication between two processors, namely a host processor and a GMIC. And they are not designed to allow two processors to randomly access each other's memory. As is described further hereinafter, the subject invention utilises the payload of a data packet to permit processor-to-processor communications and the data identifier byte in the header of a CSI or DSI packet to allow each processor to randomly access the memory of the other.

Figure 2:
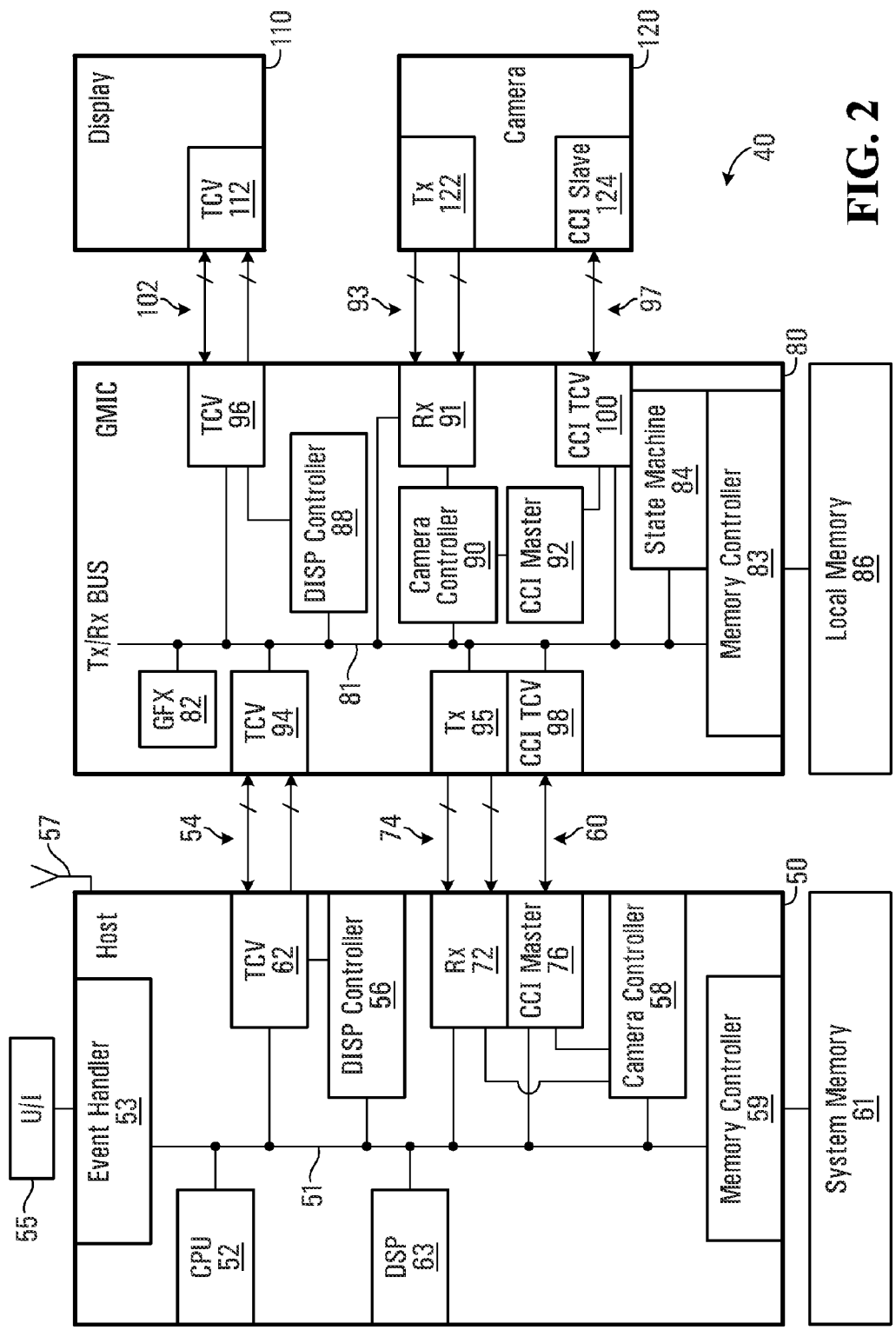
FIG. 2 is a schematic view of a portion of a mobile electronic device made in accordance with this invention.

FIG. 2 illustrates a system architected in accordance with this invention. Turning to FIG. 2, an electronic device 40 may have a host processor 50 with a central bus 51 connected to a central processing unit (CPU) 52, an event handler 53, a display controller 56, a camera controller 58, and a memory controller 59. The event handler 53 is connected to a user interface 55. The memory controller is connected to system memory 61. The host processor 50 may also have a digital signal processor (DSP) 63 and an antenna or RF interface 57 for wireless data communication. The host processor may be provided with a DSI and a CSI which are connected into the central bus. More specifically, the host processor may have the following components connected to the bus 51: a DSI transceiver 62 terminating serial clock and data lines (differential pairs) 54, a CSI receiver 72 terminating serial clock and data lines (differential pairs) 74, and a CCI Master 76 terminating I$^2$C lines 60. The display controller also connects directly to the DSI transceiver 62 and the camera controller also connects directly to the CCI master 76 as well as the CSI receiver 72.

A GMIC 80 has a central bus 81 to which is connected a graphics engine (GFX) 82, a memory controller 83, a state machine 84, a display controller 88, and a camera controller 90. To provide a serial interface with the host 50, the GMIC has the following additional components connected to the bus: a DSI transceiver 94 terminating serial clock and data lines 54 and a CSI transmitter 95 terminating serial clock and data lines 74. To provide a serial interface with a display, the GMIC is also provided with a DSI transceiver 96 connected to the bus and terminating clock and data lines 102. The display controller also connects directly to the DSI transceiver 96. And to provide a serial interface with a camera, the GMIC is provided with a CSI receiver 91 which is connected to the bus and terminates clock and data lines 93 and a CCI transceiver 95 which terminates I$^2$C lines 97 and which connects to camera controller 90 through a CCI master 92. The CCI transceiver 95 is also connected to a CCI transceiver 98 which terminates I²C lines 60.

A display 110 has a DSI transceiver 112 which terminates serial lines 102 A camera 120 has a CSI transmitter 122 which terminates serial lines 93 and a CCI slave 124 which terminates I²C lines 97.

Since the serial lines 74 of the CSI between the host and the GMIC are uni-directional—from GMIC to host—the DSI serial lines 54 are used for communication from the host to the GMIC and the CSI serial lines 74 are used for communication from the GMIC to the host. In this way, high speed full duplex communication may be achieved between the GMIC and the host. (The CCI master is not used to send data to the GMIC because the I²C interface, which does not utilise differential pairs, is relatively slow.)

If a device had only a DSI, half duplex bi-directional communication would be available between the host and the described GMIC over the DSI serial lines 64.

With the arrangement of FIG. 2, the host 50 normally communicates with the GMIC 80 in order to implement tasks that affect the display 110 or the camera 120. For example, if the mobile communications device 40 is used to play a video game involving an avatar, the user may depress a button of the user interface 55 (for example, a telephone keypad button where the device 40 is a cell phone) to move the avatar to the left. The event handler 53 captures the event and sends an event message to the bus 51 causing the CPU 52 of the host processor 50 to generate a command for the GFX 82 of the GMIC 80: For example, "move background three pixels to the right". The command is a series of bytes. The CPU can generate a packet with a payload containing these command bytes and the address of the GFX command buffer located inside local memory 86. The packet is sent by the transceiver 62 over data lines 54. Transceiver 94 of the GMIC receives the packet and after de-packetizing it passes the payload to local memory 86 via bus 81 and memory controller 83. The state machine 84 is configured to monitor bus 81 activities and/or provide DMA mechanism for transferring data from/to local memory. The GFX 82 reads the commands from the command buffer located in local memory 86 and after processing it requests the background pixel data from local memory 86. The GFX processes this background pixel data in order to move the background three pixels to the right. The GFX then writes/renders this new background data into local memory. Next the display controller 88 reads the recently rendered graphics information from local memory 86 so that the new pixel data is ported to the display controller. The display controller then encapsulates the data into DSI packets and passes it to the transceiver 96 which sends the packets over lines 102 to the transceiver 112 of the display 110. The pixel data is then recovered and displayed.

As a second example, a button may be pressed on the user interface 55 of the host 50 to request the camera 120 take a picture. This event is captured by the event handler 53 and passed to the bus 51 where it is read by the CPU 52. The CPU constructs a suitable command which is encapsulated in a packet and then sent to the GMIC over the DSI link, i.e., over lines 54. This command is addressed to the camera controller 90 of the GMIC and so this controller reads the command and, in response, signals the CCI master 92. The CCI master 92 in response to the signal from the camera controller 90 causes the CCI transceiver 100 to send a suitable command over line 97 to the CCI slave 124 of the camera 120. The result is the camera is prompted to take a picture. Once the picture is taken, the pixel (image) data is encapsulated in packets at the CSI transmitter 122 of the camera and sent over lines 93 to the CSI receiver 91 of the GMIC. The GMIC receiver 91 extracts the payload from the packets and puts it on bus 81 where the data is received by local memory 86 and stored. The state machine 84 may then set up a path between the local memory and the GFX so that image data is retrieved by the GFX for further processing. For example, the GFX may blend the captured image with additional overlays. The processed data is then stored back in local memory.

If a user later uses the user interface to request that the picture which was taken be recalled, the host sends an event command to the GMIC causing the GMIC to retrieve the picture data and port the pixel data to the display 110.

Figure 3:
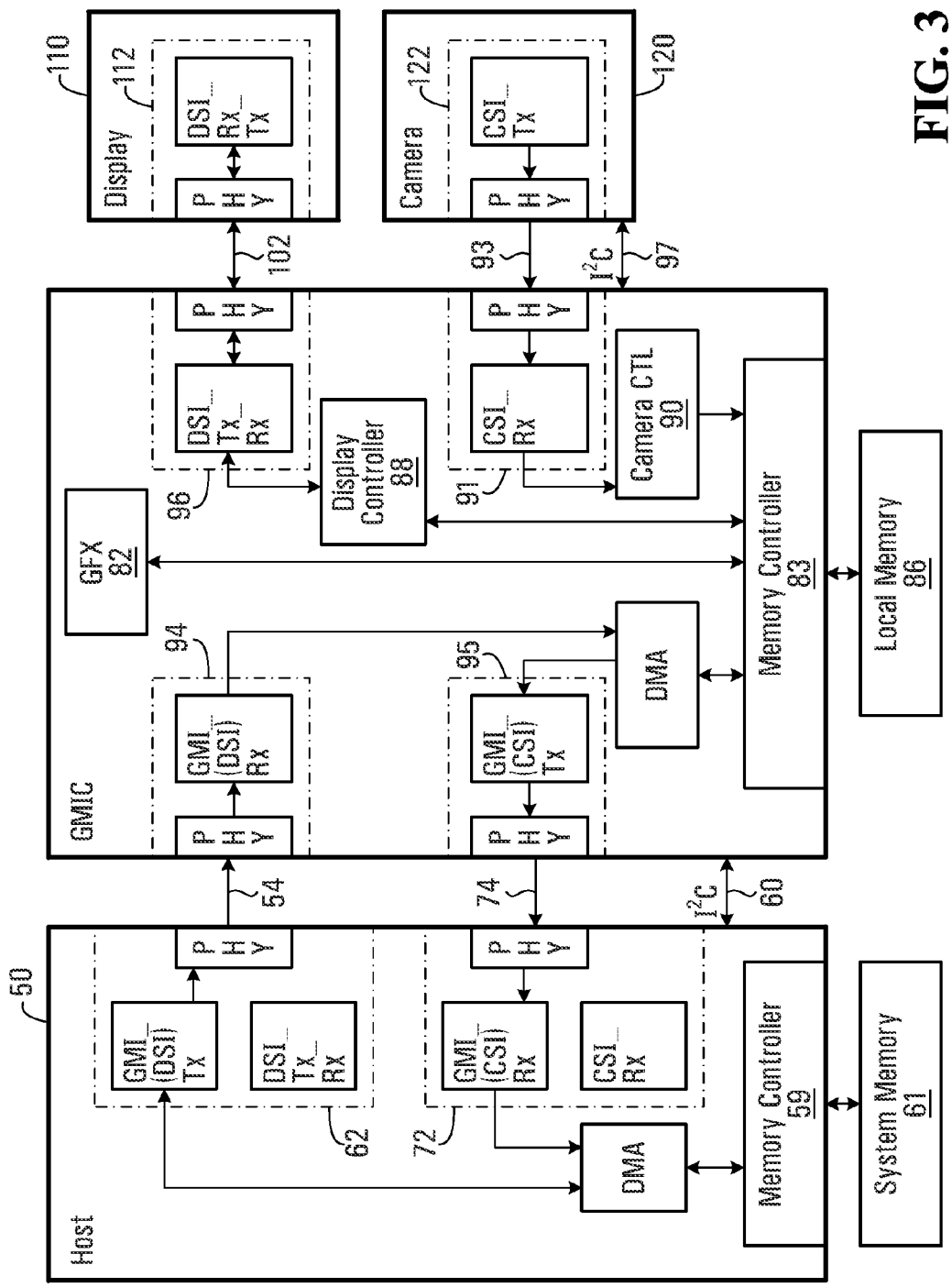
FIG. 3 is a functional block diagram illustrating a normal mode of operation of the portion of the mobile electronic device of FIG. 2.

The foregoing two examples involve a normal mode of operation for the GMIC. During the Normal mode of operation most internal sub-blocks of GMIC are active and performing a variety of tasks, e.g. 2D or 3D graphics. The Normal mode is expanded in FIG. 3 to show that the TCV 62 and Rx 72 blocks within HOST 50 of FIG. 2 can contain two separate protocol layers sitting on top of a physical layer. Specifically, TCV 62 contains the contemplated DSI protocol layer multiplexed with a graphics multi-media interface (GMI) transmit (Tx) layer (which will be described hereinafter) whereas Rx 72 contains a CSI protocol layer multiplexed with another GMI layer. Similarly, TCV 94 and Tx 95 of GMIC 80 in FIG. 2 are expanded to show that a GMI (Rx) protocol layer in TCV 94 and a GMI (Tx) layer in Tx 95 are used between the HOST and GMIC to facilitate full duplex communication while in Normal mode.

The TCV 96 and Rx 91 in the GMIC contain the contemplated DSI and CSI protocols layered on top of a physical layer—which is also the case for TCV 112 and Tx 122 of DISPLAY 110 and CAMERA 120 in FIG. 2, respectively.

A second operational state is also envisaged for the GMIC: a bypass mode. Specifically, where the host does not currently need the co-processing power or the memory of the GMIC (as, for example, when only a clock is displayed on the display 110), the described architecture allows components of the GMIC to be put in a low power mode, i.e. as in GMIC Bypass mode. The host can command the GMIC to enter this low power mode. Responsive to this command, the DSI transceivers 94, 96, CCI transceivers 98, 100, and CSI Rx 91 and Tx 95 of the GMIC are set by the state machine 84 so as to simply pass through any arriving packets, the GFX 82, state machine 84, GMIC display controller 88, GMIC camera controller 90, memory controller 83 and/or local memory 86 can potentially enter an inactive low power mode. When in this low power state, the host 50 can control the display 110 and camera 120 directly using its own display controller 56 and camera controller 58—via the DSI and PHY layers as well as CSI and PHY layers, rather than GMI and PHY layers. Specifically, the host display controller 56 can send a display command over the DSI link 54 and it will pass through the GMIC DSI transceivers 94, 96 to the display 110. Similarly, the host's camera controller 58 can send a camera command over the CCI link 60 and it will pass through the GMIC CCI transceivers 98, 100 to the CCI slave 124 of the camera. If the host sent a command to the camera to take a picture, the host would also activate its CSI receiver 72 so that data returning from the camera would pass directly to the host's receiver and from there it could be stored.

Figure 4:
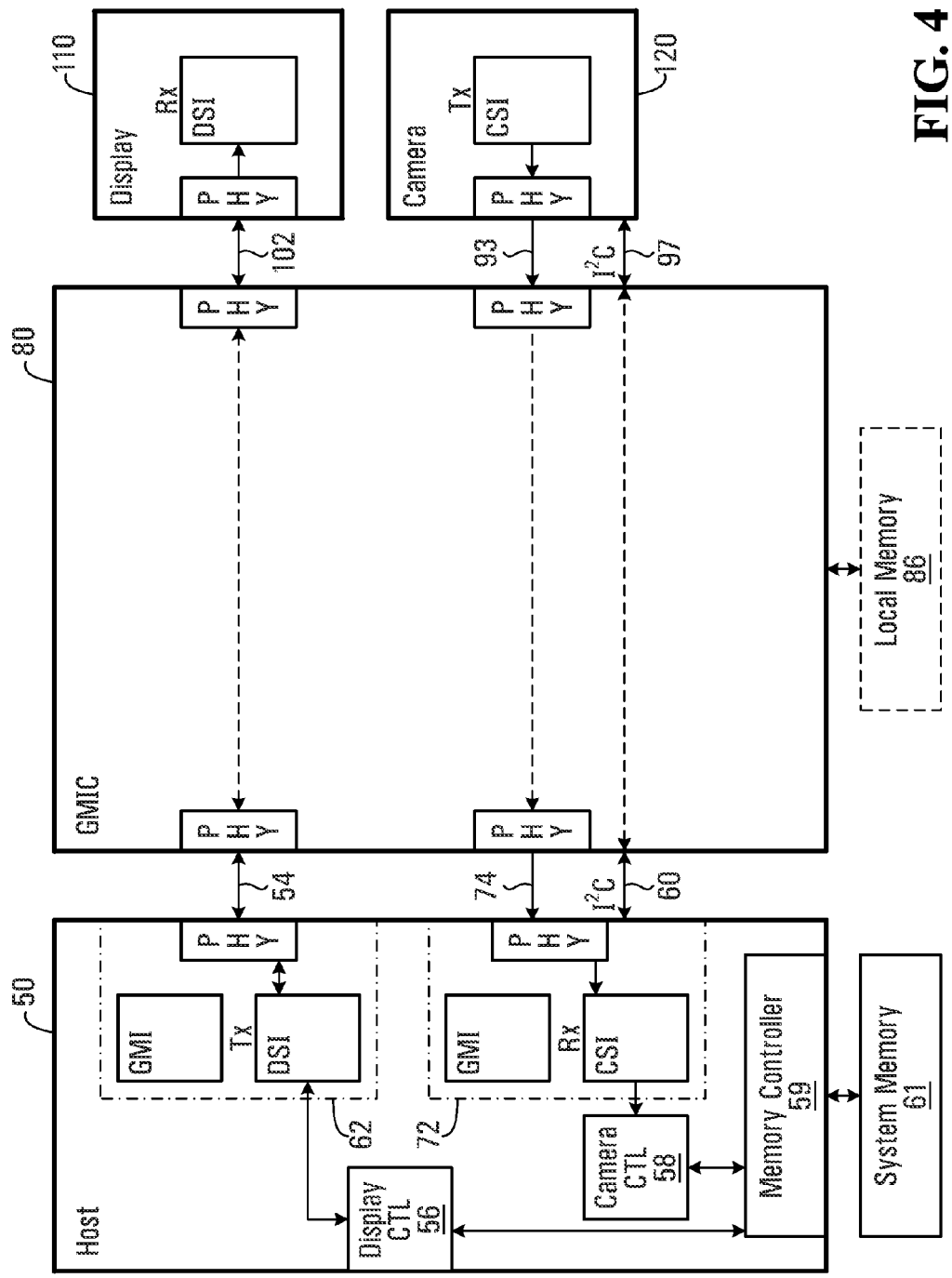
FIG. 4 is a functional block diagram illustrating a bypass mode of operation of the portion of the mobile electronic device of FIG. 2, FIGS. 5A and 5B are charts setting out a sample message set for the protocol layer.

FIG. 4 demonstrates the Bypass mode of operation. In this mode, the HOST 50 directly controls DISPLAY 110 and CAMERA 120, bypassing GMIC. In order to communicate with display and camera modules, the DSI (Tx and Rx) and CSI (Rx) protocol layers within TCV 62 and Rx 72 are used by the HOST. In this mode, the GMIC only provides internal bypass paths and can be put into a low power state for saving power and extending the battery life. The I²C interface 60 is also internally connected to I²C interface 97 via GMIC in by pass mode, so the HOST can directly control the camera.

The contemplated DSI and CSI contemplate a layered architecture similar to the Open Systems Interconnection (OSI) protocol. In low power mode, the higher layers, including a packet communication layer, may be dormant. However, at least the lowest layer, i.e., the physical layer, remains active. There can be different mechanisms for switching between Normal and Bypass GMIC modes.

Returning to FIG. 3, during the Normal mode the HOST uses the GMI and PHY layers for communicating to the GMIC. The HOST can set a particular bit within the GMIC by issuing a direct write packet to indicate its intention for switching to Bypass mode (i.e. GMIC in low power). After that, the HOST will switch the interfacing layers to DSI and PHY for outbound and CSI and PHY for inbound traffic in order to directly control display and camera modules. Since the GMIC does not have a DSI or CSI layer at the interface with the HOST, i.e. TCV 94 and Tx 95 are composed of GMI and PHY layers, it may not be able to interpret incoming DSI packets while in Bypass mode. Thus, in order to switch back to Normal mode from Bypass, HOST may: 1) use the I²C interface for waking up the GMIC, 2) use a physical layer trigger as a wake up indication, or 3) send a GMI packet, e.g. via writing to a particular location (but this option requires that the GMI layer within TCV 94 is kept powered up during Bypass mode for snooping on incoming packets.)

It will be apparent from the foregoing that in a Normal mode of operation, the GMIC controls the camera and display based on commands from the host whereas in a low power mode, the host controls the display and camera directly using its display controller and camera controller.

In general, the GMI protocol could be designed as a generic protocol layer on top of a physical layer. However, in order to keep design complexity, costs and power consumption at minimum, we show that existing DSI and CSI protocols can easily be extended to a GMI layer.

In the contemplated CSI and DSI, packet headers are defined to be composed of 4 bytes: one data identifier byte, two word count or data bytes, and a final ECC byte. Two types of packets are defined: Short Packets are composed of four byte headers only, namely a data identifier byte, two data bytes and a final ECC byte whereas Long Packets are comprised of a four byte header portion followed by a payload (length of payloads are defined by two word count bytes in the header) and a two byte CRC footer. For all packets, the one byte data identifier field of headers is always comprised of a two bit field specifying a virtual channel and a remaining six bit field specifying the data type—e.g. specifying read or write operations or whether the packet is short or long. Since not all data type values are defined by the DSI and CSI, we can use some of the reserved or even generic data types for defining additional GMI protocol layer as an extension to DSI/CSI protocols. As mentioned earlier, one can aim at designing the GMI protocol quite generic and totally independent from both DSI and CSI—obviously with extra cost and power penalties.

FIG. 5A illustrates an example GMI protocol built from DSI reserved data types, to enable the HOST to access GMIC resources—e.g. internal memory 86. Similarly, FIG. 5B depicts an example GMI protocol built from CSI reserved data types, to enable GMIC for accessing HOST resources—e.g. system memory 61. For each direction, new packets are defined for randomly accessing memory mapped resources. Random access can be performed in two ways: 1) direct 2) indirect. In direct addressing mode, the address explicitly accompanies the read/write request. In indirect addressing mode however, the address needs to be set prior to issuing a read/write request and incremented after receiving subsequent reads/writes. The first two write packets in FIGS. 5A/5B are designed for setting a 32 bit address, via two 16 bit write short packets. In general indirect addressing is more efficient in terms of bandwidth utilization for linear accesses as in streaming images or video—i.e. no need to send addresses for every subsequent access. Direct addressing read/write long packets are defined for both directions as well. Here, the address field (i.e. four bytes) is embedded within DSI/CSI packet payloads—word count needs to be adjusted accordingly as mentioned in FIG. 3A/3B. A read response long packet is also defined for each direction for responding to direct or indirect read requests.

The first two bits of the data identifier define a DSI/CSI virtual channel and are not used in FIG. 5A/5B GMI protocol example. This is to avoid increasing the complexity of GMI decoders. However, one could utilize virtual channel bits along with other 6 reserved data type bits in order to define GMI packets. This would allow four extra permutations for each reserved data type. Moreover, as mentioned before, both the DSI and CSI define generic packets which are application specific. Some GMI packets could also be designed using generic data types for each direction.

Since the known CSI and DSI do not provide mechanisms for flow control, the message set may provide a flow control mechanism, such as a simple credit-based system. For example, each of the host and GMIC may implement a credit counter loaded with an initial value of, say, ten. Then, whenever the host sends a packet to the GMIC, it must decrement its counter. Conversely, whenever the host receives a credit packet from the GMIC, it increments its counter. In the credit-based system, the host is only allowed to send packets to the GMIC when its credit counter is above zero. The GMIC follows these same rules. Each of the host and GMIC may be provided with transmit buffers to store packets awaiting transmission and receive buffers to store packets awaiting processing.

Typically, the design of an integrated circuit (IC) begins with the establishment of a high-level architecture. A hardware description language (HDL) is then used to capture this high-level architecture in order to model the IC. Thus, the HDL is used to write executable specifications of the hardware. The HDL model allows checks to be performed on the proposed IC which may result in modifications of the architecture, and the HDL code. Once the HDL code is finalized, a software program called a synthesizer infers hardware logic operations from the HDL language statements to produce an equivalent netlist of generic hardware primitives to implement the specified behaviour. Graphic Design Solution (GDS) software may then be used to implement a structured layout for the hardware primitives. Lastly, the IC can be fabricated from the design description.

Figure 6:
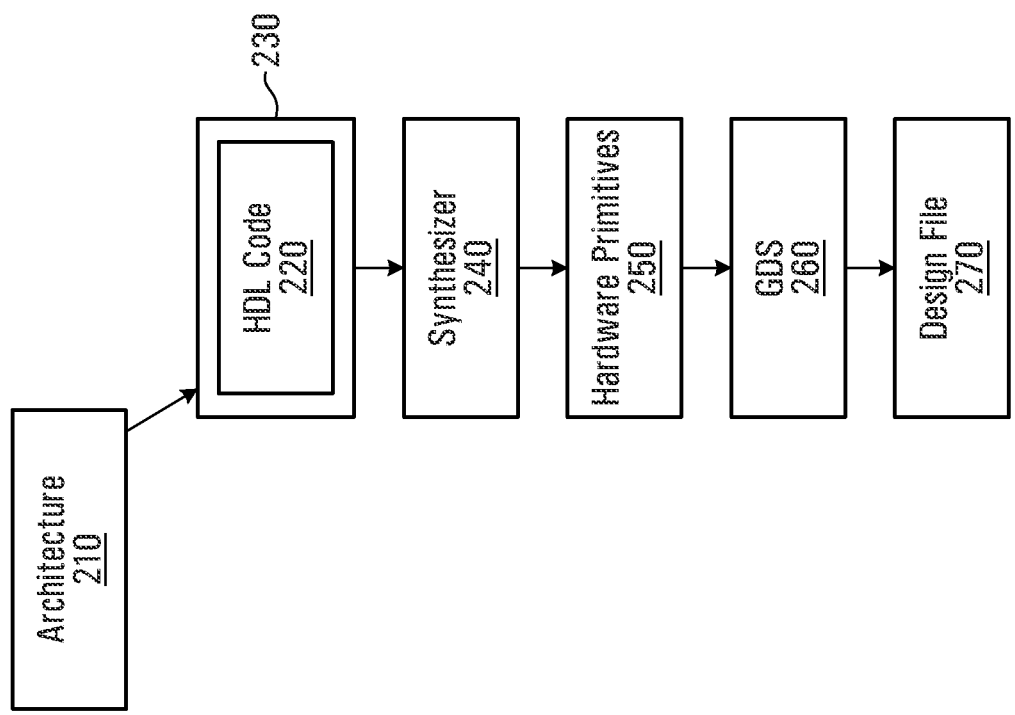
FIG. 6 is a flow chart illustrating steps in construction of a portion of the mobile electronic device of FIG. 2.

The described GMIC 80 may be implemented in this fashion, as illustrated in FIG. 6. Turning to FIG. 6, a high level architecture 210 for the GMIC is used to generate HDL code 220 stored in a computer readable medium 230. The computer readable medium 230 may input a synthesizer 240 to generate hardware primitives 250. These hardware primitives may input GDS software 260 to create a final design file 270 from which the GMIC may be fabricated.

With the described approach to incorporating a GMIC in a device, a manufacturer could readily produce two models of the device—one with the GMIC and one without it—with very little other modification to the device.

Other modifications will be apparent to those skilled in the art and, therefore, the invention is defined in the claims.

What is claimed is:

1. A method of communicating at a graphics multi-media integrated circuit comprising:
    receiving data packets compatible with a display serial interface packet protocol from a host over a first half duplex bi-directional serial link, said packets containing instructions for a processing module of said graphics multi-media integrated circuit;
    processing packets from said host in accordance with said instructions at said processing module;
    sending data packets compatible with a camera serial interface packet protocol toward said host over a first uni-directional serial link.

2. The method of claim 1 further comprising sending packets according to said display serial interface packet protocol to a display over a second half duplex bi-directional serial link and receiving packets according to said display serial interface packet protocol from said display over said second bi-directional serial link.

3. The method of claim 2 further comprising receiving packets according to said camera serial interface packet protocol from a camera over a second uni-directional serial link.

4. The method of claim 3 further comprising sending camera commands to said camera over a third bi-directional serial link.

5. The method of claim 4 further comprising, when in a low power mode, receiving camera commands from said host over a fourth bi-directional serial link, wherein said fourth bi-directional serial link is slower than either said second bi-directional serial link or said first bi-directional serial link.

6. The method of claim 5 further comprising, after receiving an indication from said host requesting lower power operation, passing packets received on said first bi-directional serial link to said second bi-directional serial link and passing packets received on said second bi-directional serial link to said first bi-directional serial link.

7. The method of claim 6 further comprising receiving an indication on said fourth serial link to cease operating in said low power mode.

8. The method of claim 6 further comprising receiving an indication via a low level protocol on said first half duplex bi-directional serial link to cease operating in said low power mode.

9. The method of claim 6 further comprising receiving an indication via a data packet on said first half duplex bi-directional serial link to cease operating in said low power mode.

10. The method of claim 2 further comprising, after receiving an indication from said host requesting lower power operation, passing packets received on said first bi-directional serial link to said second bi-directional serial link and passing packets received on said second bi-directional serial link to said first bi-directional serial link.

11. The method of claim 10 further comprising, after said receiving said indication, passing packets from said second uni-directional link to said first uni-directional link.

12. The method of claim 1 wherein said processing comprises parsing a data identifier from a received packet.

13. The method of claim 12 wherein said data identifier indicates a command and, in response, processing a payload of said received packet as a command.

14. The method of claim 13 wherein said data identifier indicates a write operation and, in response, using said payload of said received packet in completing said operation.

15. A system, comprising:
    a graphics multi-media integrated circuit (GMIC) comprising:
        a first GMIC display serial interface transceiver;
        a GMIC camera serial interface transmitter;
        a processing module; and
        a bus connecting said GMIC display serial interface transceiver, said GMIC camera serial interface transmitter, said processing module;
    a host comprising:
        a host display serial interface transceiver;
        a host camera serial interface receiver;
    a half duplex display serial interface pathway connecting said first GMIC display serial interface transceiver with said host display serial interface transceiver; and
    a uni-directional camera serial interface pathway connecting said GMIC camera serial interface transmitter with said host camera serial interface receiver;
    wherein said host is operable to send instructions for said processing module by way of said half duplex display serial interface.

16. The system of claim 15 wherein said GMIC further comprises a second GMIC display serial interface transceiver and further comprising:
    a display having a display serial interface transceiver; and
    a half duplex display serial interface pathway connecting said second GMIC display serial interface transceiver with said display serial interface transceiver.

17. The system of claim 16 wherein said GMIC further comprises a GMIC camera serial interface receiver and further comprising:
    a camera having a camera serial interface transmitter; and
    a uni-directional camera serial interface pathway connecting said GMIC camera serial interface receiver with said camera serial interface transmitter.

18. The system of claim 17 wherein said host has a host camera control interface master, said GMIC has a GMIC camera control interface slave, a bi-directional pathway connects host camera control interface master with said GMIC camera control interface slave, said GMIC has a GMIC camera control interface master, said camera has a camera control interface slave, and a bi-directional pathway connects said second GMIC camera control interface master with said camera control interface slave.

19. A graphics multi-media integrated circuit (GMIC) comprising:
    a processing module;
    a first half duplex bi-directional display serial interface transceiver for connection to a host, said serial interface transceiver for receiving packets compatible with a first protocol and containing instructions for said processing module;
    a first uni-directional camera serial interface transmitter for connection to said host for sending packets compatible with a second protocol; and
    a bus connecting said display serial interface transceiver, said camera serial interface transmitter and said processing module.

20. The GMIC of claim 19 further comprising:
    a second half duplex bi-directional display serial interface for connection to a display for sending packets to said display and receiving packets from said display; and
    a second uni-directional camera serial interface for connection to a camera for receiving packets from said camera.

* * * * *